US009466242B2

(12) United States Patent
Qing et al.

(10) Patent No.: US 9,466,242 B2
(45) Date of Patent: Oct. 11, 2016

(54) PIXEL CIRCUIT FOR ORGANIC LIGHT EMITTING DIODE, DRIVING METHOD FOR PIXEL CIRCUIT AND ACTIVE MATRIX ORGANIC LIGHT EMITTING DIODE DISPLAY DEVICE (71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Haigang Qing, Beijing (CN); Xiaojing Qi, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 131 days.

(21) Appl. No.: 14/368,863

(22) PCT Filed: Jul. 5, 2013

(86) PCT No.: PCT/CN2013/078920
§ 371 (c)(1),
(2) Date: Jun. 26, 2014

(87) PCT Pub. No.: WO2014/169537
PCT Pub. Date: Oct. 23, 2014

(65) Prior Publication Data
US 2015/0221255 A1 Aug. 6, 2015

(30) Foreign Application Priority Data

Apr. 15, 2013 (CN) .......................... 2013 1 0129893

(51) Int. Cl.
G09G 3/30 (2006.01)
G09G 3/32 (2016.01)
(Continued)

(52) U.S. Cl.
CPC ............. G09G 3/3258 (2013.01); G06F 3/044 (2013.01); G06F 3/0412 (2013.01);
(Continued)

(58) Field of Classification Search
CPC G09G 3/3258; G09G 3/3233; G06F 3/0412; G06F 3/044
USPC .................. 345/76–81, 173–178; 315/169.3; 178/18.01–18.11
See application file for complete search history.

(56) References Cited

U.S. PATENT DOCUMENTS

2007/0040772 A1   2/2007  Kim
2011/0102403 A1*  5/2011  Kim ..................... G09G 3/3233
                                                           345/211
2014/0049169 A1   2/2014  Li et al.

FOREIGN PATENT DOCUMENTS

| CN | 101726890 A | 6/2010 |
| CN | 102881255 A | 1/2013 |
| CN | 203232681 U | 10/2013 |

OTHER PUBLICATIONS

Second Chinese Office Action dated Dec. 23, 2014; Appln. No. 201310129893.5.
International Search Report Appln. No. PCT/CN2013/078920; Dated Jan. 23, 2014.
(Continued)

Primary Examiner — Adam J Snyder
(74) Attorney, Agent, or Firm — Ladas & Parry LLP (57) ABSTRACT A pixel circuit, a driving method for driving the pixel circuit and a display device comprising the pixel circuit. The pixel circuit insulates the electric connection between the drain of the driving transistor and the organic light-emitting diode by the insulating transistor when the data is written into the storage capacitor, and the threshold voltage of the driving transistor and the data voltage signal are pre-stored by the storage capacitor, which can compensate the shift in the threshold voltage effectively and in turn can ensure the uniformity and stabilization of the driving current. Additionally, the touch control circuit in the embodiments of the present disclosure multiplexes the scan signal of the pixel circuit, and the coupling capacitor in the touch control circuit is charged through the charging transistor while the storage capacitor is charged, therefore an integration of the touch control circuit into the pixel circuit is achieved perfectly.

12 Claims, 9 Drawing Sheets (51) Int. Cl.
*G06F 3/041* (2006.01)
*G06F 3/044* (2006.01)
*G09G 3/10* (2006.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2320/043* (2013.01)

(56) References Cited

OTHER PUBLICATIONS

First Chinese Office Action Appln. No. 201310129893.5; Dated Sep. 2, 2014.
International Preliminary Report on Patentability issued Oct. 20, 2015; PCT/CN2013/078920.

\* cited by examiner

PIXEL CIRCUIT FOR ORGANIC LIGHT EMITTING DIODE, DRIVING METHOD FOR PIXEL CIRCUIT AND ACTIVE MATRIX ORGANIC LIGHT EMITTING DIODE DISPLAY DEVICE

TECHNICAL FIELD

The present disclosure relates to the technical field of organic light-emitting display, and more particularly to a pixel circuit, a driving method for driving the pixel circuit and a display device comprising the pixel circuit.

BACKGROUND

As compared with a traditional liquid crystal panel, an AMOLED (Active Matrix Organic Light Emitting Diode) panel has characteristics of rapider response speed, higher contrast, wider angle of view and the like, therefore the AMOLED has been get an increasing attention of display device developers.

Figure 1:
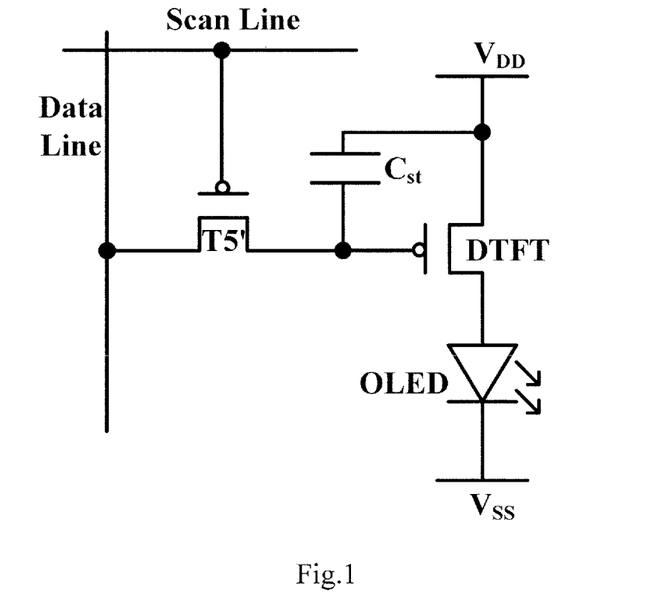
FIG. 1 is an exemplary diagram illustrating a structure of a pixel circuit in the prior art.

An Active Organic Light Emitting diode is driven by a pixel circuit to emit light. A traditional 2T1C pixel circuit is composed of tow transistors (TFTs) and one capacitor (C), and as illustrated in FIG. 1, particularly comprises a driving transistor DTFT, a switching transistor T5' and a storage capacitor $C_{st}$. The switching transistor T5' is controlled by a scan line signal $V_{scan}$, and is configured to control inputting of a data voltage $V_{data}$, the driving transistor DTFT is configured to control the Organic Light-Emitting Diode (OLED) to emit light, and the storage capacitor $C_{st}$ is configured to provide a sustaining voltage for a gate of the driving transistor DTFT.

Figure 2:
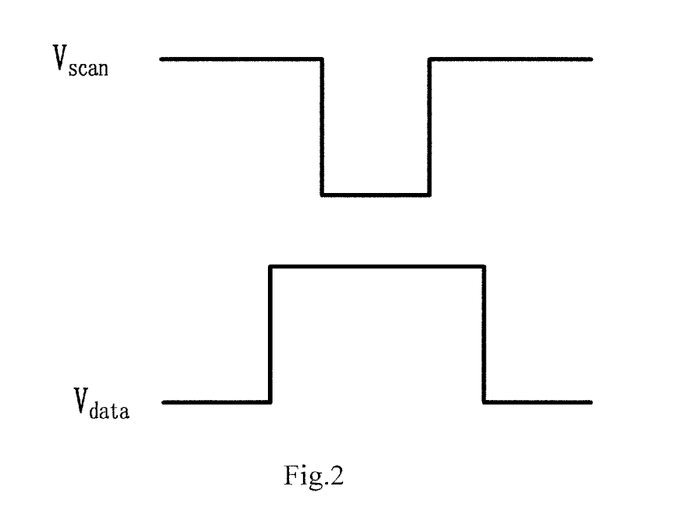
FIG. 2 is a driving timing chart of the pixel circuit shown in FIG. 1.

FIG. 2 is a driving timing chart of the 2T1C pixel circuit shown in FIG. 1. An operation process of the 2T1C pixel circuit is as follows. When the scan signal is at a low level, the switching transistor T5' is turned on, a gray scale voltage on a data line charges the storage capacitor $C_{st}$, meanwhile the data voltage $V_{data}$ is applied to the gate of the driving transistor DTFT, so that the driving transistor DTFT operates in a saturation state and drives the Organic Light-Emitting Diode OLED to emit light. When the scan signal is at a high level, the switching transistor T5' is turned off, the storage capacitor $C_{st}$ provides the sustaining voltage to the gate of the driving transistor DTFT, so that the driving transistor DTFT is still in the saturation state and the OLED goes on to emit light.

It can be seen from above that the OLED in the AMOLED can emit light because it is driven by a driving current generated by the driving transistor DTFT operating in the saturation state, and more particularly the driving current (namely a current flowing through the OLED) can be represented by $I_{OLED}=K(V_{gs}-|V_{thd}|)^2$, where $V_{gs}$ is a voltage difference between the gate and a source of the driving transistor DTFT, $|V_{thd}|$ is a threshold voltage of the driving transistor DTFT, and K is a constant associated with a structure of the driving transistor DTFT per se and the manufacturing process. Because the uniformity in the threshold voltages $V_{th}$ of the transistors is poor in the existing Low Temperature Poly-Silicon process and the threshold voltage would shift during a usage process, different threshold voltages of the driving transistors DTFT would generate different driving currents although the same data voltage $V_{data}$ is applied to the driving transistors DTFT, such that the uniformity in the brightness on the AMOLED panel is poor.

Recently, a touch control function has been applied more widely in various display panels, especially in a mobile display, and nearly becomes a standard configuration for a smart phone. In the prior art, a display panel and a Touch Screen Panel (TSP) are manufactured separately at first, and then are fixed together. Such process leads to a complex process and a high cost for the panel to realize both of a display function and a touch control function, and is helpless for producing a lighter and thinner touch panel. TST in cell technique integrates the display function and the touch control function, and may be accomplished only by one process instead of two processes, therefore it not only has advantages such as low cost but also can simplify the process and make the touch panel be lighter and thinner. However, no solution is proposed so far regarding how to integrate a touch control circuit and the pixel circuit perfectly.

SUMMARY

An object of the present disclosure is to provide a pixel circuit capable of compensating the shift in the threshold voltage of the driving transistor so as to enhance the uniformity in brightness of an OLED display panel. Further, in the present disclosure, a touch control circuit is integrated into the above pixel circuit perfectly without adding complexity to the circuit structure and its operation.

The present disclosure further aims to provide a driving method for driving the above pixel circuit and a display device comprising the above pixel circuit, which can enhance a display quality of the display device.

According to embodiments of the present disclosure, there is provided a pixel circuit comprising an electroluminescent device, a driving transistor, a first switching unit, a compensating unit, an insulating unit and a storage capacitor.

The first switching unit is configured to control writing of a data voltage on a data line, a first terminal of the first switching unit is connected with a first terminal of the storage capacitor, and a second terminal thereof is connected with the data line. A second terminal of the storage capacitor is connected with a gate of the driving transistor and a first terminal of the compensating unit.

The compensating unit is configured to pre-store a threshold voltage of the driving transistor into the storage capacitor, and a second terminal of the compensating unit is connected with a drain of the driving transistor. A source of the driving transistor is connected with a power supply terminal, and the drain thereof is connected with a first terminal of the insulation unit.

The insulating unit is configured to insulate an electric connection between the driving transistor and the electroluminescent device, and a second terminal of the insulating unit is connected with a first terminal of the electroluminescent device. A second terminal of the electroluminescent device is connected with a ground terminal.

In an example, the electroluminescent device is an Organic Light-Emitting Diode, the first switching unit is first switching transistor, the compensating unit is a compensating transistor, and the insulating unit is an insulating transistor.

A gate of the first switching transistor is connected with a first scan signal terminal, a source thereof is connected with the first terminal of the storage capacitor, and a drain thereof is connected with the data line. The second terminal of the storage capacitor is connected with the gate of the driving transistor and a drain of the compensating transistor.

A gate of the compensating transistor is connected with the first scan signal terminal, and a source thereof is connected with the drain of the driving transistor.

The source of the driving transistor is connected with the power supply terminal, and the drain thereof is connected with a source of the insulating transistor. A gate of the insulating transistor is connected with a second control signal terminal, and a drain thereof is connected with an anode of the organic light-emitting diode. A cathode of the organic light-emitting diode is connected with the ground terminal.

In an example, a second switching transistor is further comprised; a gate of the second switching transistor is connected with the first control signal terminal, a source thereof is connected with the first terminal of the storage capacitor, and a drain thereof is connected with a reference voltage terminal.

In an example, the pixel circuit is further connected with a touch control circuit, and the touch control circuit comprises a charging transistor, a coupling capacitor, a sensing electrode, an amplifying transistor, a third switching transistor, a second scan signal terminal and a sensing line. A gate of the charging transistor is connected with a third control signal terminal, a source thereof is connected with the second terminal of the storage capacitor, and a drain thereof is connected with a first terminal of the coupling capacitor, the sensing electrode and a gate of the amplifying transistor. A second terminal of the coupling capacitor is connected with the first control signal terminal. A source of the amplifying transistor is connected with the power supply terminal, and a drain thereof is connected with a source of the third switching transistor. A gate of the third switching transistor is connected with the second scan signal terminal, and a drain thereof is connected with the sensing line.

In an example, the third control signal terminal is the first scan signal terminal.

In an example, all of the transistors have a same channel type.

According to the embodiments of the present disclosure, there is further provided a driving method for driving the above pixel circuit, comprising steps of:

S1, applying a scan signal at the first scan signal terminal to turn on the first switching transistor and the compensating transistor, applying control signals at the first control signal terminal and the second control signal terminal to turn off the second switching transistor and the insulating transistor, so that a threshold voltage of the driving transistor and the data voltage on the data line are written into the storage capacitor; and S2, applying a scan signal at the first scan signal terminal to turn off the first switching transistor and the compensating transistor, applying control signals at the first control signal terminal and the second control signal terminal to turn on the second switching transistor and the insulating transistor, and driving the organic light-emitting diode to emit light by using the voltages stored in the storage capacitor.

In an example, before the step S1, the driving method further comprises: applying a scan signal at the first scan signal terminal and applying a control signal at the second control signal terminal to turn on the first switching transistor, the compensating transistor, the insulating transistor and the charging transistor, applying a control signal at the first control signal terminal and applying a scan signal at the second scan signal terminal to turn off the second switching transistor and the third switching transistor, and resetting the storage capacitor and the coupling capacitor.

In an example, the step S1 further comprises: turning on the charging transistor by the scan signal applied at the first scan signal terminal, applying a scan signal at the second scan signal terminal to turn off the third switching transistor, and charging, by the power supply terminal, the coupling capacitor through the driving transistor and the charging transistor; the step S2 further comprises: turning off the charging transistor by the scan signal applied at the first scan signal terminal, applying a scan signal at the second scan signal terminal to turn on the third switching transistor, and monitoring changes in a current on the sensing line.

In the embodiments of the present disclosure, there is further provided a display device comprising any one of the above pixel circuits.

The pixel circuit according to the embodiments of the present disclosure insulates the electric connection between the drain of the driving transistor and the organic light-emitting diode by the insulating transistor when the data is written into the storage capacitor, and the threshold voltage of the driving transistor and the data voltage signal are pre-stored by the storage capacitor, which can compensate the shift in the threshold voltage effectively and in turn can ensure the uniformity and stabilization of the driving current. Additionally, the touch control circuit in the embodiments of the present disclosure multiplexes the scan signal of the pixel circuit, and the coupling capacitor in the touch control circuit is charged through the charging transistor while the storage capacitor is charged, therefore an integration of the touch control circuit into the pixel circuit is achieved perfectly without adding complexity to the circuit structure and its operation.

DETAILED DESCRIPTION

Thereafter, implementations of the embodiments of the present disclosure will be further described in connection with drawings and embodiments. The following embodiments are only illustrative, instead of being considered as limiting a scope of the present disclosure.

Embodiment 1

Figure 3:
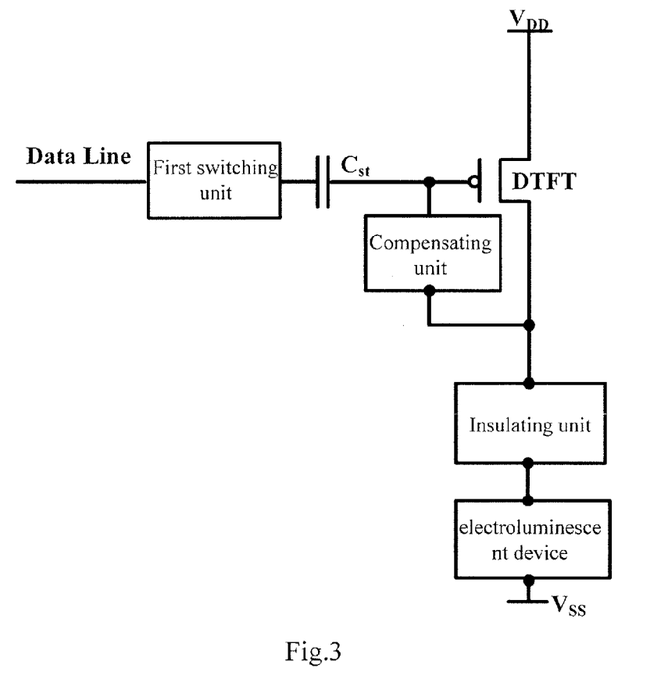
FIG. 3 is an exemplary block diagram of the pixel circuit according to an Embodiment 1 of the present disclosure.

The present embodiment will be described by taking a pixel circuit structure of a common-cathode organic light-emitting diode display as an example. The pixel circuit in the present embodiment is as illustrated in FIG. 3, and comprises an electroluminescent device, a driving transistor, a first switching unit, a compensating unit, an insulating unit and a storage capacitor. The first switching unit is configured to control writing of a data voltage on a data line, a first terminal of the first switching unit is connected with a first terminal of the storage capacitor, and a second terminal thereof is connected with the data line. A second terminal of the storage capacitor is connected with a gate of the driving transistor and a first terminal of the compensating unit. The compensating unit is configured to pre-store a threshold voltage of the driving transistor into the storage capacitor, and a second terminal of the compensating unit is connected with a drain of the driving transistor. A source of the driving transistor is connected with a power supply terminal, and the drain thereof is connected with a first terminal of the insulation unit. The insulating unit is configured to insulate an electric connection between the driving transistor and the electroluminescent device, and a second terminal of the insulating unit is connected with a first terminal of the electroluminescent device. A second terminal of the electroluminescent device is connected with a ground terminal.

Figure 4:
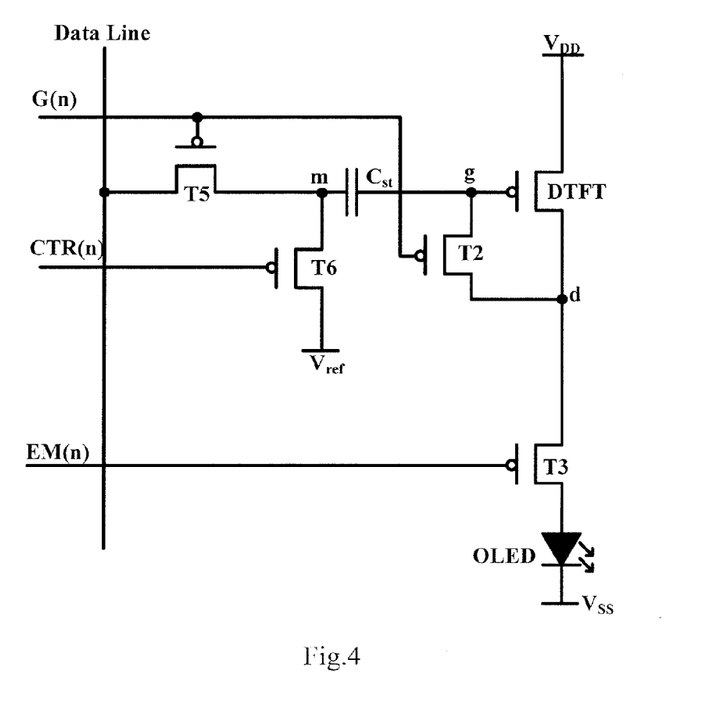
FIG. 4 is an exemplary diagram illustrating a structure of the pixel circuit according to the Embodiment 1 of the present disclosure.

A detailed structure of the pixel circuit in the present embodiment may be as illustrated in FIG. 4 and comprise the driving transistor DTFT and the storage capacitor $C_{st}$, the electroluminescent device is an Organic Light-Emitting Diode OLED, the first switching unit is first switching transistor T5, the compensating unit is a compensating transistor T2, and the insulating unit is an insulating transistor T3. The pixel circuit also comprises the power supply terminal $V_{DD}$ and the ground terminal $V_{SS}$. A first scan signal terminal provides a scan signal to turn on or off the first switching transistor T5 and the compensating transistor T2, and the data line Data Line writes a data voltage signal to the pixel circuit through the first switching transistor T5.

A gate of the first switching transistor T5 is connected with the first scan signal terminal, a source thereof is connected with the first terminal of the storage capacitor $C_{st}$, and a drain thereof is connected with the Data Line. Under the control of the scan signal provided from the first scan signal terminal, the first switching transistor T5 provides the data voltage signal on the Data Line to the storage capacitor $C_{st}$ and the storage capacitor $C_{st}$ holds the same. The second terminal of the storage capacitor $C_{st}$ is connected with the gate of the driving transistor DTFT and a drain of the compensating transistor T2.

A gate of the compensating transistor T2 is connected with the first scan signal terminal, and a source thereof is connected with the drain of the driving transistor DTFT. A source of the driving transistor DTFT is connected with the power supply terminal $V_{DD}$, and the drain thereof is connected with a source of the insulating transistor T3. Under the control of the scan signal provided from the first scan signal terminal, the compensating transistor T2 is turned on, and the gate and drain of the driving transistor DTFT are connected to each other to form a diode-connection, such that the driving transistor DTFT is ensured to be in a saturation current zone. Under the driving of the power supply terminal $V_{DD}$, the threshold voltage of the driving transistor DTFT is stored in the storage capacitor $C_{st}$ by charging the storage capacitor $C_{st}$ with the driving transistor DTFT, such that the object of compensating the threshold voltage can be achieved. The driving transistor DTFT is turned on or off under the control of the voltage stored in the storage capacitor $C_{st}$, such that a current flowing through the driving transistor DTFT is controlled by the voltage stored in the storage capacitor $C_{st}$.

A gate of the insulating transistor T3 is connected with a second control signal terminal, a drain thereof is connected with an anode of the Organic Light-Emitting Diode OLED, and a cathode of the Organic Light-Emitting Diode OLED is connected with the ground terminal. Under the control of a control signal provided from the second control signal terminal, the insulating transistor T3 is turned on or off. The insulating transistor T3 is turned off when the data voltage signal on the Data Line is written into the pixel circuit, so as to prevent the following problem: if the insulating transistor T3 is turned on, a current flows through the Organic Light-Emitting Diode OLED, which may cause the storage capacitor $C_{st}$ unable to store the threshold voltage of the driving transistor DTFT and the data voltage, and also may cause flickering of the Organic Light-Emitting Diode OLED display.

The pixel circuit according to the present embodiment may further comprise a second switching transistor T6. A gate of the second switching transistor T6 is connected with a first control signal terminal, a source thereof is connected with the first terminal of the storage capacitor $C_{st}$, and a drain thereof is connected with a reference voltage terminal. Under the control of a control signal provided from the first control signal terminal, the second switching transistor T6 is turned on to provide a potential signal at the reference voltage terminal to the storage capacitor $C_{st}$, in order to clamp a potential at the gate of the driving transistor DTFT, which may prevent the potential from being interfered by the noise and fluctuating.

The pixel circuit according to the present embodiment may be compatible with a data driving chip of both a voltage amplitude modulation type and a pulse width modulation type, and be configured to provide voltage signals required to the first scan signal terminal, the Data Line, the first control signal terminal, the second control signal terminal and the like.

Another advantage of the pixel circuit according to the present embodiment is the application of transistors with a single channel type, that is, all of the transistors are P channel type transistors, so that a complication of the manufacture process and its product cost are reduced. Of course, those skilled in the art also may easily obtain a circuit in which all of the transistors are N channel type transistors or CMOS (Complementary Metal Oxide Semiconductor) transistors based on the pixel circuit provided by the present embodiment. Also, the present embodiment is applicable to a common-anode Organic Light-Emitting Diode OLED display and is not limited to the common-cathode Organic Light-Emitting Diode OLED display, and its details are omitted herein.

Figure 5:
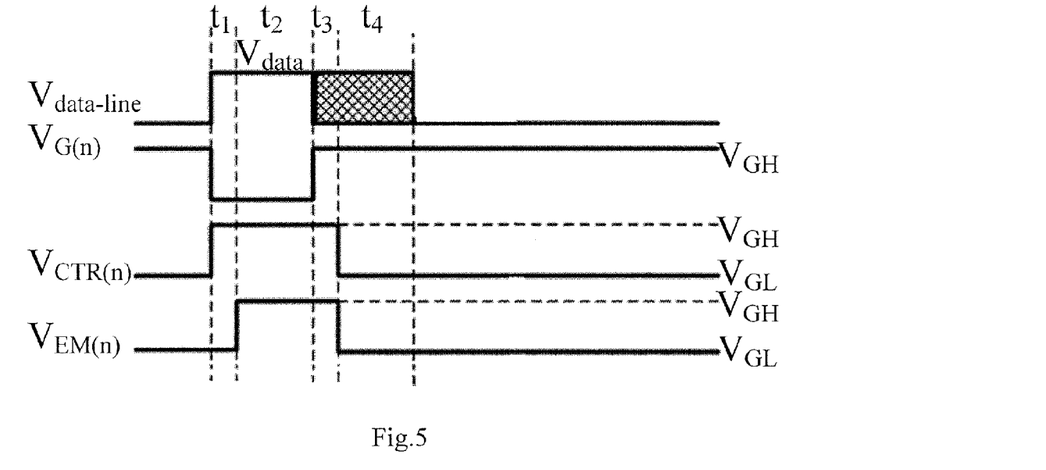
FIG. 5 is a driving timing chart of the pixel circuit shown in FIG. 4.

According to the embodiments of the present disclosure, there is further provided a driving method for driving the above described pixel circuit, and its driving timing chart is as illustrated in FIG. 5. In the driving timing chart, changes in a scan signal voltage G(n) at the first scan signal terminal, a data voltage $V_{data}$ on the Data Line, a control signal voltage CTR(n) at the first control signal terminal and a control signal voltage EM(n) at the second control signal terminal in a frame of operation timing are shown. The storage capacitor $C_{st}$ is needed to be discharged before the data voltage signal is written into the pixel circuit so as to eliminate an affect caused by data from a previous frame, and this period is a timing period $t_1$. The driving method mostly comprises two stages, that is, a stage for compensating the threshold voltage of the driving transistor DTFT (namely a timing period $t_2$) and a stage for driving and displaying (namely timing periods $t_3$ and $t_4$), and the writing of data is completed in the stage for compensating.

In the stage for compensating the threshold voltage of the driving transistor DTFT, the compensating transistor T2 and the driving transistor DTFT pre-store the threshold voltage of the driving transistor DTFT and the data voltage $V_{data}$ on the Data Line in the storage capacitor $C_{st}$ under the control of multi-level voltage signals. In the stage for driving and displaying, the storage capacitor $C_{st}$ holds the threshold voltage and the data voltage $V_{data}$ to be unchanged. Thereafter, the respective timing periods would be described in details in connection with FIGS. 6-9, respectively.

Resetting Timing Period $t_1$

Figure 6:
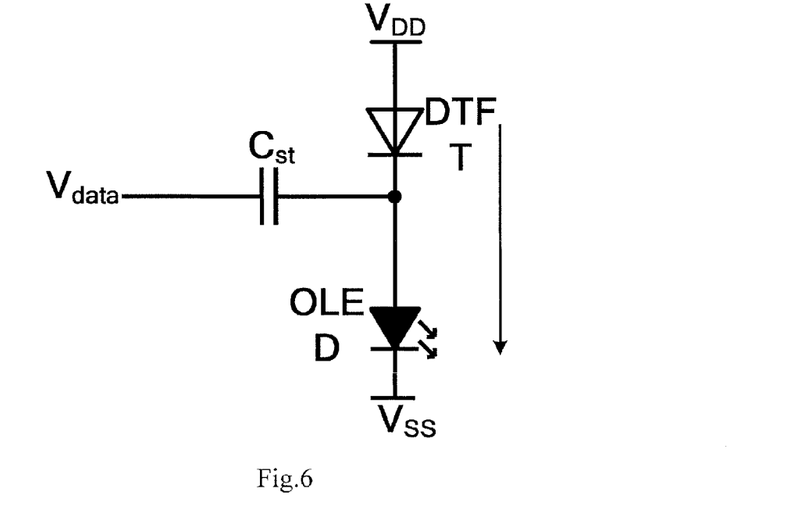
FIG. 6 is an exemplary diagram illustrating an equivalent circuit of the pixel circuit shown in FIG. 4 in a $t_1$ stage.

An equivalent circuit diagram in this timing period is as illustrated in FIG. 6. During this timing period, the scan signal voltage G(n) at the first scan signal terminal and the control signal voltage EM(n) at the second control signal terminal are at the low level, the first switching transistor T5, the insulating transistor T3 and the compensating transistor T2 are turned on, the control signal voltage CTR(n) at the first control signal terminal is at the high level, the second switching transistor T6 is turned off, the gate and drain of the driving transistor DTFT are connected to each other to form a diode connection, and the storage capacitor $C_{st}$ is discharged through the compensating transistor T2. This timing period is a resetting stage for eliminating residual voltage signals from the previous stage.

Compensating Timing Period $t_2$

Figure 7:
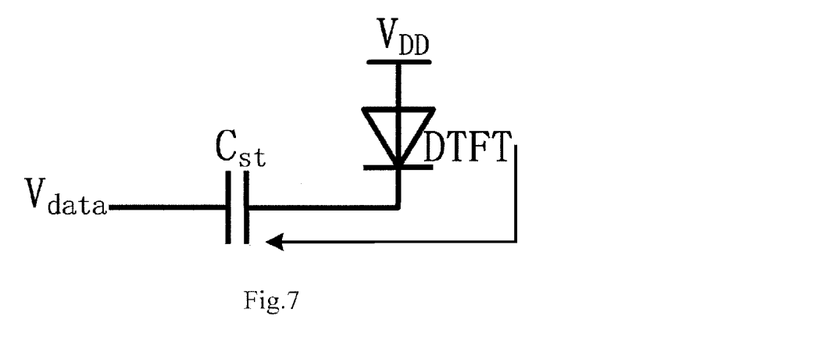
FIG. 7 is an exemplary diagram illustrating an equivalent circuit of the pixel circuit shown in FIG. 4 in a $t_2$ stage.

An equivalent circuit diagram in this timing period is as illustrated in FIG. 7. In this timing period, the Organic Light-Emitting Diode OLED is in a turn-off state, and an initial voltage being equal to the threshold voltage of the Organic Light-Emitting Diode OLED approximately and the data voltage $V_{data}$ on the Data Line are pre-stored in the storage capacitor $C_{st}$. Particularly, the scan signal voltage G(n) at the first scan signal terminal remains the low level to be unchanged when the data voltage $V_{data}$ is written into the pixel circuit, so that the switching transistor and the compensating transistor T2 are in the turn-on state; the control signal voltage CTR(n) at the first control signal terminal remains the high level to be unchanged, the control signal voltage EM(n) at the second control signal terminal jumps to the high level, and the insulating transistor T3 is turned off. Because the driving transistor DTFT is in the diode-connection, it can be ensured that the driving transistor DTFT operates in the current saturation zone, the power supply terminal $V_{DD}$ provides a stable driving current to charge the storage capacitor $C_{st}$ through the driving transistor DTFT, until a potential at a node g rises up to $V_{DD}-|V_{thd}|$, where $V_{thd}$ is the threshold voltage of the driving transistor DTFT. At this time, the driving transistor DTFT is turned off, the voltage signal on the data line is $V_{data}$ in this stage, and thus a voltage across the storage capacitor $C_{st}$ is $V_{DD}-|V_{thd}|-V_{data}$. In addition, since the second switching transistor T6 is in the turn-off state, a reference potential cannot reach the first terminal of the storage capacitor.

Insulating Timing Period $t_3$

Figure 8:
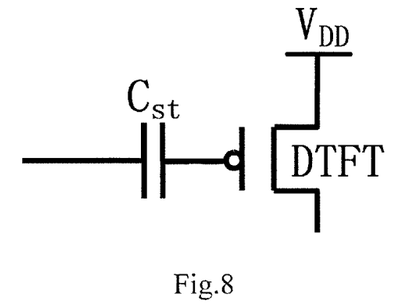
FIG. 8 is an exemplary diagram illustrating an equivalent circuit of the pixel circuit shown in FIG. 4 in a $t_3$ stage.

An equivalent circuit diagram in this timing period is as illustrated in FIG. 8. In this timing period, the control signal voltage CTR(n) at the first control signal terminal and the control signal voltage EM(n) at the second control signal terminal remain to be unchanged, the scan signal voltage G(n) at the first scan signal terminal jumps to the high level, the first switching transistor T5 and the compensating transistor T2 are turned off. Although the driving transistor DTFT is not in the diode-connection, the potentials at the respective nodes are held to be unchanged. This timing period is an insulating stage for preventing noises from being inputted when the signals jump simultaneously. It should be noted that the insulating timing period $t_3$ is only a preferred implementation of the embodiments of the present disclosure, and also may be completed in a following timing period $t_4$.

Driving and Displaying Timing Period $t_4$

Figure 9:
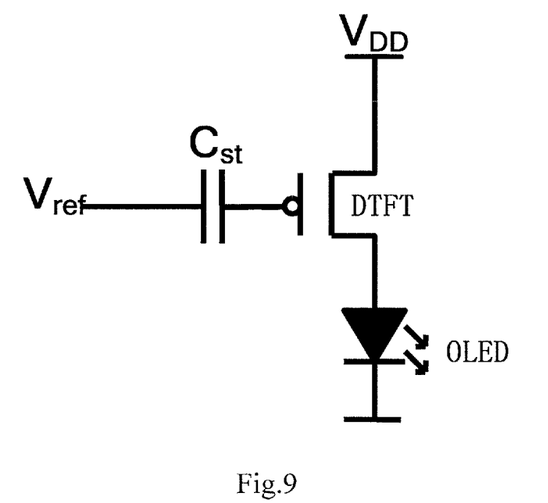
FIG. 9 is an exemplary diagram illustrating an equivalent circuit of the pixel circuit shown in FIG. 4 in a $t_4$ stage.

An equivalent circuit diagram in this timing period is as illustrated in FIG. 9. In this timing period, the Organic Light-Emitting Diode OLED is in the ON state, the voltage stored in the storage capacitor $C_{st}$ drives the Organic Light-Emitting Diode OLED to display. In particular, the scan signal voltage G(n) at the first scan signal terminal remains the high level $V_{GH}$ and is unchanged, so that the first switching transistor T5 and the compensating transistor T2 are in the turn-off state. The control signal voltage CTR(n) at the first control signal terminal jumps to the low level $V_{GL}$, the control signal voltage EM(n) at the second control signal terminal jumps to the low level, so that the insulating transistor T3 and the second switching transistor T6 are in the turn-on state. Therefore, the potential at node m jumps to a potential $V_{ref}$, and the Organic Light-Emitting Diode OLED is in the ON state. Since the gate of the driving transistor DTFT is floating, therefore a potential at the gate of the driving transistor DTFT jumps to $V_g=V_{DD}-|V_{thd}|+V_{ref}-V_{data}$ correspondingly; and a gate-source voltage of the driving transistor DTFT is $V_{sg}=V_s-V_g=V_{DD}-(V_{DD}-|V_{thd}|+V_{ref}-V_{data})=|V_{thd}|+V_{data}-V_{ref}$. At this time, the driving transistor DTFT is in the saturation state and provides a stable driving current to the Organic Light-Emitting Diode OLED. The driving current of the Organic Light-Emitting Diode OLED is $I_{oled}=K(V_{sg}-|V_{thd}|)^2=K(|V_{thd}|+V_{data}-V_{ref}-V_{thd})^2=K(V_{data}-V_{ref})^2$, where K is a constant associated with processes and the driving design. It can be seen from above that the driving current $I_{oled}$ is independent of the threshold voltage of the driving transistor DTFT, thus the shift of the threshold voltage of the driving transistor DTFT would not affect the drain current (that is, the driving current $I_{oled}$ of the pixel circuit).

Embodiment 2

Figure 10:
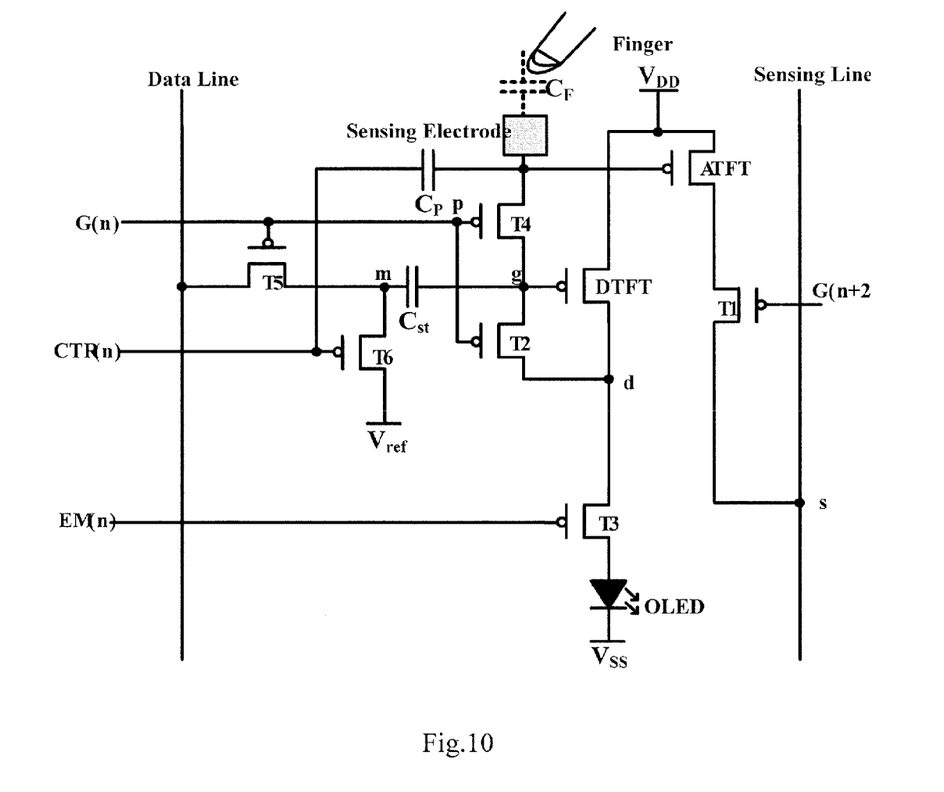
FIG. 10 is an exemplary diagram illustrating a structure of the pixel circuit according to the Embodiment 2 of the present disclosure.

According to the present disclosure, a touch control circuit is further integrated into the pixel circuit perfectively. On the basis of the pixel circuit according to the Embodiment 1, FIG. 10 illustrates a pixel circuit according to the present embodiment, which further comprises a touch control circuit integrated into the above pixel circuit, besides the Organic Light-Emitting Diode OLED, the driving transistor DTFT, the first switching transistor T5, the compensating transistor T2, the insulating transistor T3, the second switching transistor T6 and the storage capacitor $C_{st}$. The touch control circuit comprises a charging transistor T4, a coupling capacitor $C_P$, a Sensing electrode, an amplifying transistor ATFT and a third switching transistor T1.

A gate of the charging transistor T4 is connected with a third control signal terminal, a source thereof is connected with the second terminal of the storage capacitor $C_{st}$, and a drain thereof is connected with a first terminal of the coupling capacitor $C_P$, the Sensing electrode and a gate of the amplifying transistor ATFT. Under the control of a control signal provided from the third control signal terminal, the charging transistor T4 is turned on, and the coupling capacitor $C_P$ is provided with the driving voltage and hold the same while the power supply terminal $V_{DD}$ charges the storage capacitor $C_{st}$. A second terminal of the coupling capacitor $C_P$ is connected with the first control signal terminal.

A source of the amplifying transistor ATFT is connected with the power supply terminal $V_{DD}$, and a drain thereof is connected with a source of the third switching transistor T1. The amplifying transistor ATFT is mainly used to amplify a touch signal generated by a finger. A gate of the third switching transistor T1 is connected with the second scan signal terminal, and a drain thereof is connected with the −Sensing line. Under the control of the control signal provided from the second scan signal terminal, the third switching transistor T1 is turned on to transfer the amplified touch signal to the Sensing line. A touch information can be obtained by detecting changes in the signal on the Sensing line.

The third control signal terminal described above may be the first scan signal terminal in order to simplify the process and reduce the cost. The coupling capacitor $C_P$ in the touch control circuit is charged by multiplexing the scan signal in the pixel circuit, so that the integration of the touch control circuit into the pixel circuit is achieved perfectly without adding complexity to the circuit structure and its operation. Meanwhile, with the data driving chip of the pixel circuit according to the present embodiment, no specified control signal driver is needed to be configured for the touch control circuit, which can simplify the circuit structure and the processes.

Figure 11:
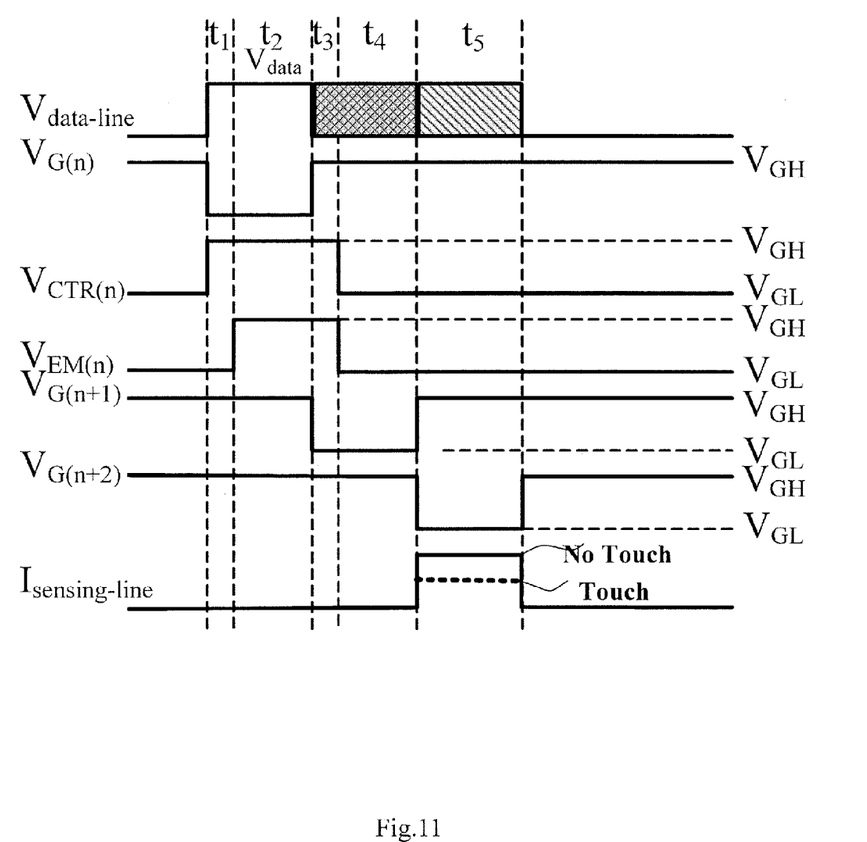
FIG. 11 is a driving timing chart of the pixel circuit shown in FIG. 10.

According to the present embodiment, there is further provided a driving method for driving the above pixel circuit, and its driving timing chart is as illustrated in FIG. 11. In the driving timing chart, changes in a scan signal voltage G(n) at the first scan signal terminal, a scan signal voltage G(n+2) at the second scan signal terminal, a data voltage $V_{data}$ on the Data Line, a control signal voltage CTR(n) at the first control signal terminal and a control signal voltage EM(n) at the second control signal terminal in a frame of operation timing are shown. Thereafter, the respective timing periods would be described in details in connection with FIGS. 12-16, respectively.

Resetting Timing Period $t_1$

Figure 12:
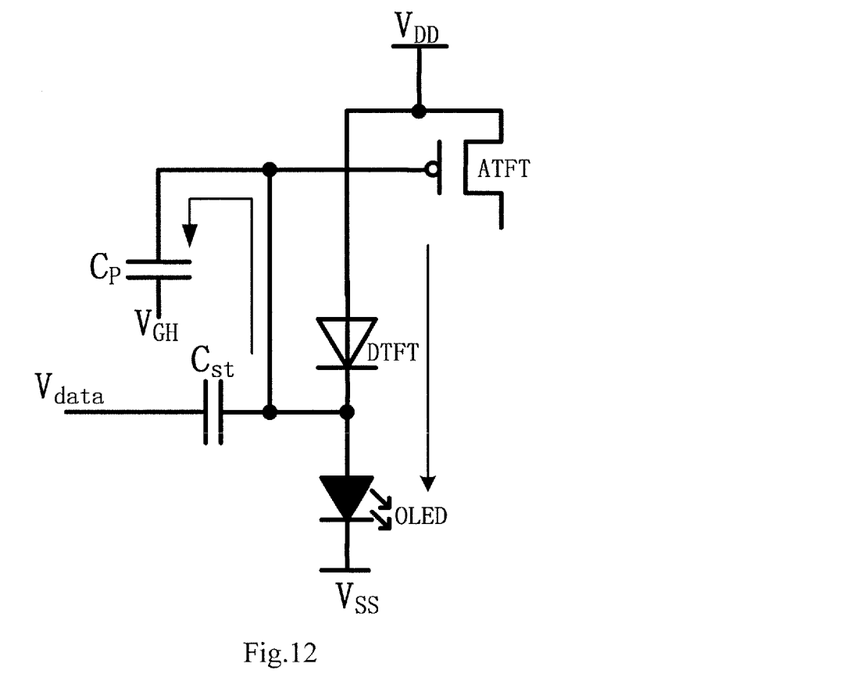
FIG. 12 is an exemplary diagram illustrating an equivalent circuit of the pixel circuit shown in FIG. 10 in a $t_1$ stage.

An equivalent circuit diagram in this timing period is as illustrated in FIG. 12. During this timing period, the scan signal voltage G(n) at the first scan signal terminal and the control signal voltage EM(n) at the second control signal terminal are at the low level, the first switching transistor T5, the insulating transistor T3, the compensating transistor T2 and the charging transistor T4 are turned on. The control signal voltage CTR(n) at the first control signal terminal and the scan signal voltage G(n+2) at the second scan signal terminal are at the high level, the second switching transistor T6 and the third switching transistor T1 are turned off. The gate and drain of the driving transistor DTFT are connected to each other to form a diode connection. The storage capacitor $C_{st}$ is discharged through the compensating transistor T2, the coupling capacitor $C_P$ is discharged through the charging transistor T4 and the compensating transistor T2, the potential at the node p is $V_{GH}$. This timing period is a resetting stage for eliminating residual voltage signals from the previous stage.

Compensating Timing Period $t_2$

Figure 13:
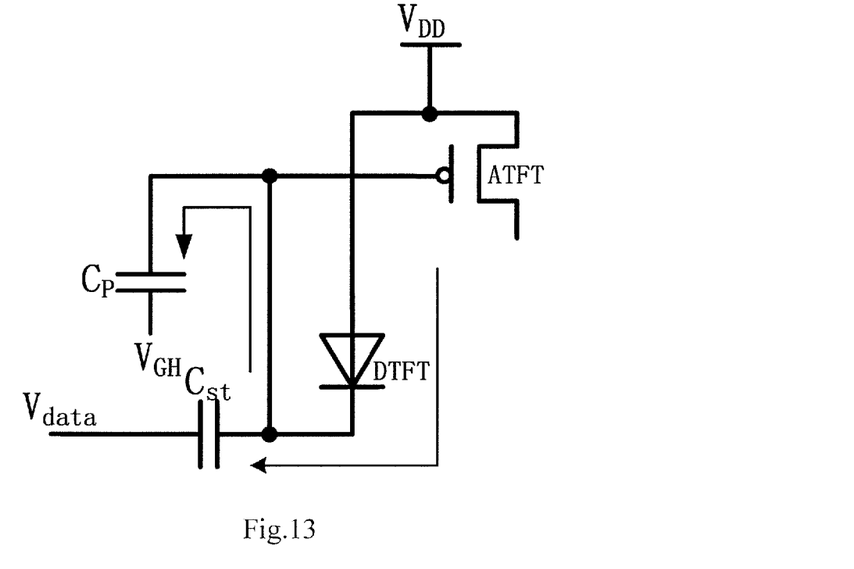
FIG. 13 is an exemplary diagram illustrating an equivalent circuit of the pixel circuit shown in FIG. 10 in a $t_2$ stage.

An equivalent circuit diagram in this timing period is as illustrated in FIG. 13. In this timing period, the Organic Light-Emitting Diode OLED is in a OFF state, and an initial voltage being equal to the threshold voltage of the driving transistor DTFT approximately and the data voltage $V_{data}$ on the Data Line are pre-stored in the storage capacitor $C_{st}$, and meanwhile the coupling capacitor $C_P$ is charged. Particularly, the scan signal voltage G(n) at the first scan signal terminal remains the low level to be unchanged when the data voltage $V_{data}$ is written into the pixel circuit, so that the first switching transistor T5 and the compensating transistor T2 are in the turn-on state. The control signal voltage CTR(n) at the first control signal terminal and the scan signal voltage G(n+2) at the second scan signal terminal remain at the high level to be unchanged, the control signal voltage EM(n) at the second control signal terminal jumps to the high level, and the insulating transistor T3 is turned off. Because the driving transistor DTFT is in the diode-connection, it is ensured that the driving transistor DTFT operates in the current saturation zone, the power supply terminal $V_{DD}$ charges the storage capacitor $C_{st}$ through the driving transistor DTFT until the potential at the node g rises up to $V_{DD}-|V_{thd}|$, the potential at the node p is also charged to $V_{DD}-|V_{thd}|$, where $V_{thd}$ is the threshold voltage of the driving transistor DTFT, and at this time the driving transistor DTFT is turned off. A voltage across the storage capacitor $C_{st}$ is $V_{DD}-|V_{thd}|-V_{data}$ because the voltage signal on the data line is $V_{data}$ in this stage. A voltage across the coupling capacitor $C_P$ is $V_{DD}-|V_{thd}|-V_{GH}$. Since the insulating transistor T3 is in the turn-off state, the Organic Light-Emitting Diode OLED is in the OFF state, which prevents the current from flowing through the Organic Light-Emitting Diode OLED and causing an incorrect display.

Insulating Timing Period $t_3$

Figure 14:
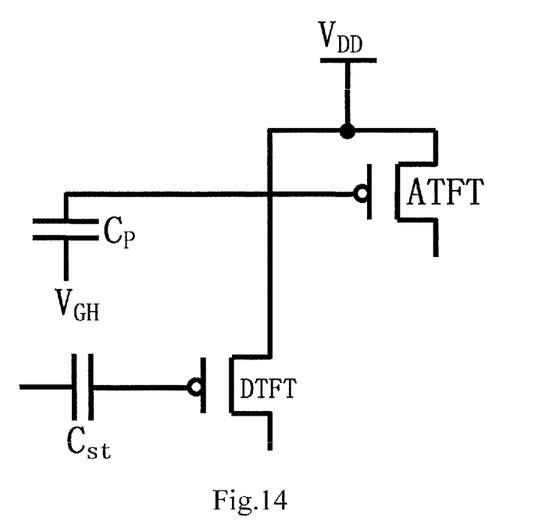
FIG. 14 is an exemplary diagram illustrating an equivalent circuit of the pixel circuit shown in FIG. 4 in a $t_3$ stage.

An equivalent circuit diagram in this ting period is as illustrated in FIG. 14. In this timing period, the control signal voltage CTR(n) at the first control signal terminal and the control signal voltage EM(n) at the second control signal terminal remain to be unchanged, the scan signal voltage G(n) at the first scan signal terminal jumps to the high level, the first switching transistor T5 and the compensating transistor T2 are turned off. Although the driving transistor DTFT is not in the diode-connection, the potentials at the respective nodes are held to be unchanged. This timing period is an insulating stage for preventing noises from being inputted when the signals jump simultaneously. It should be noted that the insulating timing period $t_3$ is only a preferred implementation of the embodiments of the present disclosure, and also may be completed in a following timing period $t_4$.

Driving and Displaying Timing Period $t_4$

Figure 15:
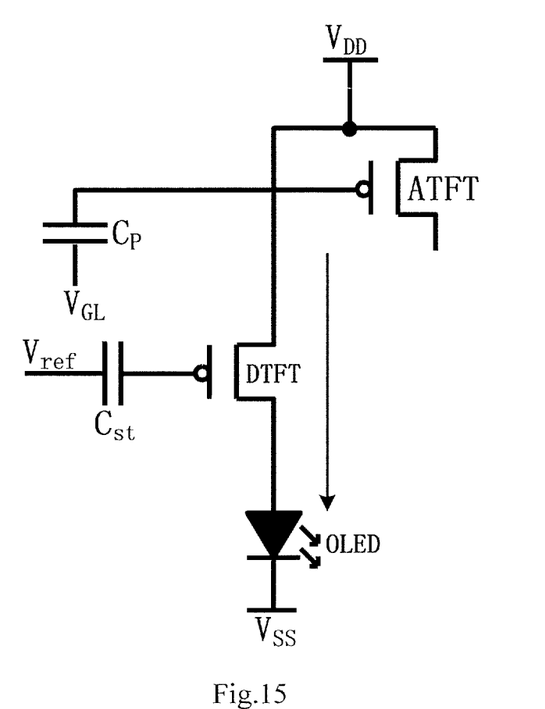
FIG. 15 is an exemplary diagram illustrating an equivalent circuit of the pixel circuit shown in FIG. 10 in a $t_4$ stage.

An equivalent circuit diagram in this timing period is as illustrated in FIG. 15. In this timing period, the Organic Light-Emitting Diode OLED is in the ON state, the voltage stored in the storage capacitor $C_{st}$ drives the Organic Light-Emitting Diode OLED to display, and the potential at the gate of the amplifying transistor ATFT reflects the touch information. In particular, the scan signal voltage G(n) at the first scan signal terminal remains the high level and is unchanged, so that the first switching transistor T5, the compensating transistor T2 and the charging transistor T4 are in the turn-off state. The scan signal voltage G(n+2) at the second scan signal terminal also remains the high level and is unchanged, so that the third switching transistor T1 is in the turn-off state. The control signal voltage CTR(n) at the first control signal terminal jumps to the low level, so that the second switching transistor T6 is in the turn-on state, the potential at node m jumps to the low level $V_{ref}$. The control signal voltage EM(n) at the second control signal terminal jumps to the low level, the insulating transistor T3 is in the turn-on state, and the Organic Light-Emitting Diode OLED is in the ON state. The gate of the driving transistor DTFT is floating, therefore a potential at the gate of the driving transistor DTFT jumps to $V_g = V_{DD} - |V_{thd}| + V_{ref} - V_{data}$ correspondingly; and a gate-source voltage of the driving transistor DTFT is $V_{sg} = V_s - V_g = V_{DD} - (V_{DD} - |V_{thd}| + V_{ref} - V_{data}) = |V_{thd}| + V_{data} - V_{ref}$. At this time, the driving transistor DTFT is in the saturation state and provides a stable driving current to the Organic Light-Emitting Diode OLED, and the driving current of the Organic Light-Emitting Diode OLED is $I_{oled} = K(V_{sg} - |V_{thd}|)^2 = K(|V_{thd}| + V_{data} - V_{ref} - |V_{thd}|)^2 = K(V_{data} - V_{ref})^2$, where K is a constant associated with processes and the driving design. It can be seen from above that the driving current $I_{oled}$ is independent of the threshold voltage of the driving transistor DTFT, thus the shift in the threshold voltage of the driving transistor DTFT would not affect the drain current (that is, the driving current $I_{oled}$ of the pixel circuit). Meanwhile, the power supple voltage ($V_{DD}$ or $V_{SS}$) has no influence on the above current formula of the pixel circuit, therefore an influence on the light-emitting current caused by internal resistances is eliminated, so that the display of the Organic Light-Emitting Diode OLED is stable and a display quality is enhanced greatly.

Because the control signal voltage CTR(n) at the first control signal terminal jumps to the low level, the potential at the gate of the amplifying transistor ATFT is also pulled down from $V_{DD} - |V_{thd}|$ through the coupling capacitor $C_P$. Detailed pulling-down processes are as follows. If a finger's touch occurs, an induction capacitor $C_F$ is formed between the Sensing electrode and the finger, therefore the potential at the gate of the amplifying transistor ATFT is $[V_{DD} - |V_{thd}| - (V_{GH} - V_{GL})] \times C_P/(C_P + C_F)$. While if no finger's touch occurs, the potential at the gate of the amplifying transistor ATFT is $V_{DD} - |V_{thd}| - (V_{GH} - V_{GL})$. Because the third switching transistor T1 is in the turn-off state during this stage, the drain of the amplifying transistor ATFT is open and no current flows.

Touch Judging Timing Period $t_5$

Figure 16:
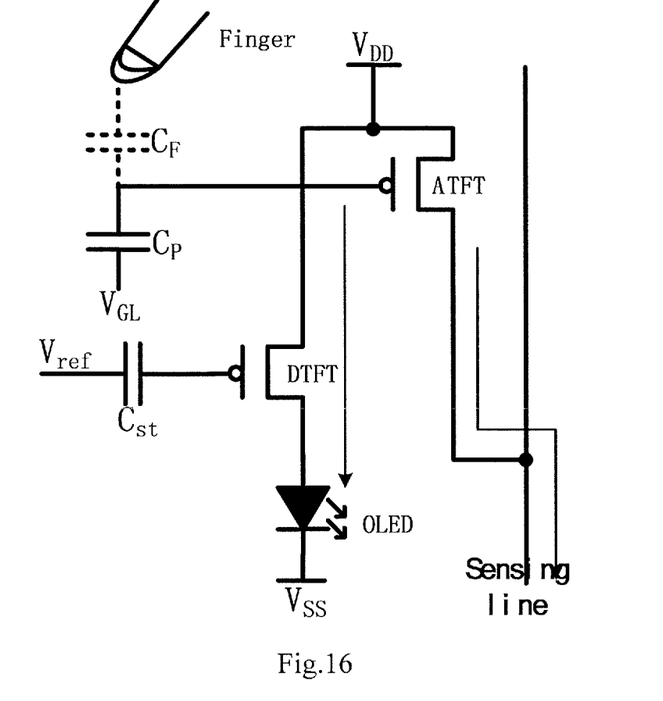
FIG. 16 is an exemplary diagram illustrating an equivalent circuit of the pixel circuit shown in FIG. 4 in a $t_5$ stage.

An equivalent circuit diagram in this timing period is as illustrated in FIG. 16. During this timing period, the scan signal voltage G(n+2) at the second scan signal terminal jumps downwards, the third switching transistor T1 is in the turn-on state, the scan signal voltage G(n) at the first scan signal terminal, the control signal voltage CTR(n) at the first control signal terminal and the control signal voltage EM(n) at the second control signal terminal are remained and unchanged.

If the finger's touch occurs, the gate-source voltage $V_{sg}$ of the amplifying transistor ATFT is:

$$V_{sg} = V_s - V_g = V_{DD} - [V_{DD} - |V_{thd}| + (V_{GL} - V_{GH})] \times C_P/(C_P + C_F)$$
$$= (|V_{thd}| + V_{GH} - V_{GL} + V_{DD} \times C_F/C_P) \times C_P/(C_P + C_F).$$

Therefore a sensing current flowing through the Sensing line is:

$$I_{se} = K_a(V_{sg} - |V_{tha}|)^2 = K_a(V_{sg} - |V_{tha}|)^2$$
$$= K_a[(|V_{thd}| + V_{GH} - V_{GL} + V_{DD} \times C_F/C_P) \times C_P/(C_p + C_F) - |V_{tha}|]^2;$$

where $V_{thd}$ is the threshold voltage of the driving transistor, $V_{tha}$ is a threshold voltage of the amplifying transistor ATFT; and $K_a$ is a constant associated with the process and design for the amplifying transistor ATFT.

If no finger's touch occurs, the gate-source voltage $V_{sg}$ of the amplifying transistor ATFT is:

$$V_{sg} = V_s - V_g = V_{DD} - [V_{DD} - |V_{thd}| - (V_{GH} - V_{GL})]$$
$$= |V_{thd}| + V_{GH} - V_{GL};$$

and the sensing current flowing through the Sensing line is:

$$I_{se} = K_a(V_{sg} - |V_{tha}|)^2 = K_a(V_{sg} - |V_{tha}|)^2$$
$$= K_a[|V_{thd}| + (V_{GH} - V_{GL}) - |V_{tha}|]^2.$$

Therefore, it can judge whether the finger's touch occurs only by detecting the current in the Sensing line, and a current difference caused by the touch may be referred to $I_{sense-line}$ in FIG. 11.

With the above stages, the driving for one row of pixels to emit light and judging for the touch are completed without adding complexity to the circuit structure and its operation, therefore an integration of the touch control circuit into the pixel circuit is achieved perfectly.

Embodiment 3

In the present embodiment, there is provided a display device comprising the above pixel circuit. More particularly, the display device comprises an array with a plurality of pixel units each corresponding to any one pixel circuit described in the above embodiments. The pixel circuit compensates the shift in the threshold voltage of the driving transistor and enables the display of the Organic Light-Emitting Diode to be stable and have no flickers, so that the display quality of the organic light-emitting display device is ensured. Meanwhile, the touch control circuit in the embodiments of the present disclosure multiplexes the scan signal of the pixel circuit, and the coupling capacitor in the touch control circuit is charged through the charging transistor while the storage capacitor is charged, therefore an integration of the touch control circuit into the pixel circuit is achieved perfectly. The integration of the display function and the touch control function is completed only by one process, instead of being completed by two processes, therefore not only it has an advantage of low cost, but also it simplifies the process and make the display device be lighter and thinner The embodiments of the present disclosure are only for illustration, and are not intended to limit the present disclosure. Modifications and variations may be made by those skilled in the art to the embodiments of the present disclosure, without departing from the spirit and scope of the present disclosure. All of the equivalent solutions are intended to be included within the scope of the following claims.

What is claimed is:

1. A pixel circuit comprising an electroluminescent device, a driving transistor, a first switching unit, a compensating unit, an insulating unit, a storage capacitor, and a touch control circuit;
   the first switching unit is configured to control writing of a data voltage on a data line, a first terminal of the first switching unit is connected with a first terminal of the storage capacitor, and a second terminal thereof is connected with the data line;
   a second terminal of the storage capacitor is connected with a gate of the driving transistor and a first terminal of the compensating unit;
   the compensating unit is configured to pre-store a threshold voltage of the driving transistor into the storage capacitor, and a second terminal of the compensating unit is connected with a drain of the driving transistor;
   a source of the driving transistor is connected with a power supply terminal, and the drain thereof is connected with a first terminal of the insulation unit;
   the insulating unit is configured to insulate an electric connection between the driving transistor and the electroluminescent device, and a second terminal of the insulating unit is connected with a first terminal of the electroluminescent device; and
   a second terminal of the electroluminescent device is connected with a ground terminal;
   the touch control circuit comprises a charging transistor, a coupling capacitor, a sensing electrode, an amplifying transistor, a third switching transistor, a second scan signal terminal and a sensing line;
      a gate of the charging transistor is connected with a third control signal terminal, a source thereof is connected with the second terminal of the storage capacitor, and a drain thereof is connected with a first terminal of the coupling capacitor, the sensing electrode and a gate of the amplifying transistor;
      a second terminal of the coupling capacitor is connected with a first control signal terminal;
      a source of the amplifying transistor is connected with the power supply terminal, and a drain thereof is connected with a source of the third switching transistor; and
   a gate of the third switching transistor is connected with the second scan signal terminal, and a drain thereof is connected with the sensing line.

2. The pixel circuit of claim 1, wherein the electroluminescent device is an Organic Light-Emitting Diode, the first switching unit is a first switching transistor, the compensating unit is a compensating transistor, and the insulating unit is an insulating transistor;
   a gate of the first switching transistor is connected with a first scan signal terminal, a source thereof is connected with the first terminal of the storage capacitor, and a drain thereof is connected with the data line;
   the second terminal of the storage capacitor is connected with the gate of the driving transistor and a drain of the compensating transistor;
   a gate of the compensating transistor is connected with the first scan signal terminal, and a source thereof is connected with the drain of the driving transistor;
   the source of the driving transistor is connected with the power supply terminal, and the drain thereof is connected with a source of the insulating transistor;
   a gate of the insulating transistor is connected with a second control signal terminal, and a drain thereof is connected with an anode of the organic light-emitting diode; and
   a cathode of the organic light-emitting diode is connected with the ground terminal.

3. The pixel circuit of claim 2, further comprising a second switching transistor; a gate of the second switching transistor is connected with the first control signal terminal, a source thereof is connected with the first terminal of the storage capacitor, and a drain thereof is connected with a reference voltage terminal.

4. The pixel circuit of claim 2, wherein the third control signal terminal is the first scan signal terminal.

5. A driving method for the pixel circuit of claim 4, comprising steps of:
   S1, applying a scan signal at the first scan signal terminal to turn on the first switching transistor, the compensating transistor and the charging transistor, applying control signals at the first control signal terminal and the second control signal terminal to turn off the second switching transistor and the insulating transistor, so that a threshold voltage of the driving transistor and the data voltage on the data line are written into the storage capacitor, and charging, by the power supply terminal, the coupling capacitor through the driving transistor and the charging transistor; and
   S2, applying a scan signal at the first scan signal terminal to turn off the first switching transistor, the compensating transistor and the charging transistor, applying control signals at the first control signal terminal and the second control signal terminal to turn on the second switching transistor and the insulating transistor, driving the organic light-emitting diode to emit light by using the voltages stored in the storage capacitor, applying a scan signal at the second scan signal terminal to turn on the third switching transistor, and monitoring changes in a current on the sensing line.

6. The driving method for the pixel circuit of claim 5, wherein the pixel circuit further comprises a second switching transistor; a gate of the second switching transistor is connected with the first control signal terminal, a source thereof is connected with the first terminal of the storage capacitor, and a drain thereof is connected with a reference voltage terminal, before the step S1, the driving method further comprises:
   applying a scan signal at the first scan signal terminal and applying a control signal at the second control signal terminal to turn on the first switching transistor, the compensating transistor, the insulating transistor and the charging transistor, applying a control signal at the first control signal terminal and applying a scan signal at the second scan signal terminal to turn off the second switching transistor and the third switching transistor, and resetting the storage capacitor and the coupling capacitor.

7. The pixel circuit of claim 2, wherein each of the transistors has a same channel type.

8. A display device comprising the pixel circuit of claim 1.

9. The display device of claim 8, wherein the electroluminescent device is an Organic Light-Emitting Diode, the first switching unit is a first switching transistor, the compensating unit is a compensating transistor, and the insulating unit is an insulating transistor;
   a gate of the first switching transistor is connected with a first scan signal terminal, a source thereof is connected with the first terminal of the storage capacitor, and a drain thereof is connected with the data line;

the second terminal of the storage capacitor is connected with the gate of the driving transistor and a drain of the compensating transistor;

a gate of the compensating transistor is connected with the first scan signal terminal, and a source thereof is connected with the drain of the driving transistor;

the source of the driving transistor is connected with the power supply terminal, and the drain thereof is connected with a source of the insulating transistor;

a gate of the insulating transistor is connected with a second control signal terminal, and a drain thereof is connected with an anode of the organic light-emitting diode; and a cathode of the organic light-emitting diode is connected with the ground terminal.

10. The display device of claim 9, further comprising a second switching transistor; a gate of the second switching transistor is connected with the first control signal terminal, a source thereof is connected with the first terminal of the storage capacitor, and a drain thereof is connected with a reference voltage terminal.

11. The display device of claim 9, wherein the third control signal terminal is the first scan signal terminal.

12. The display device of claim 9, wherein each of the transistors has a same channel type.

\* \* \* \* \*